UNITED STATES PATENT OFFICE.

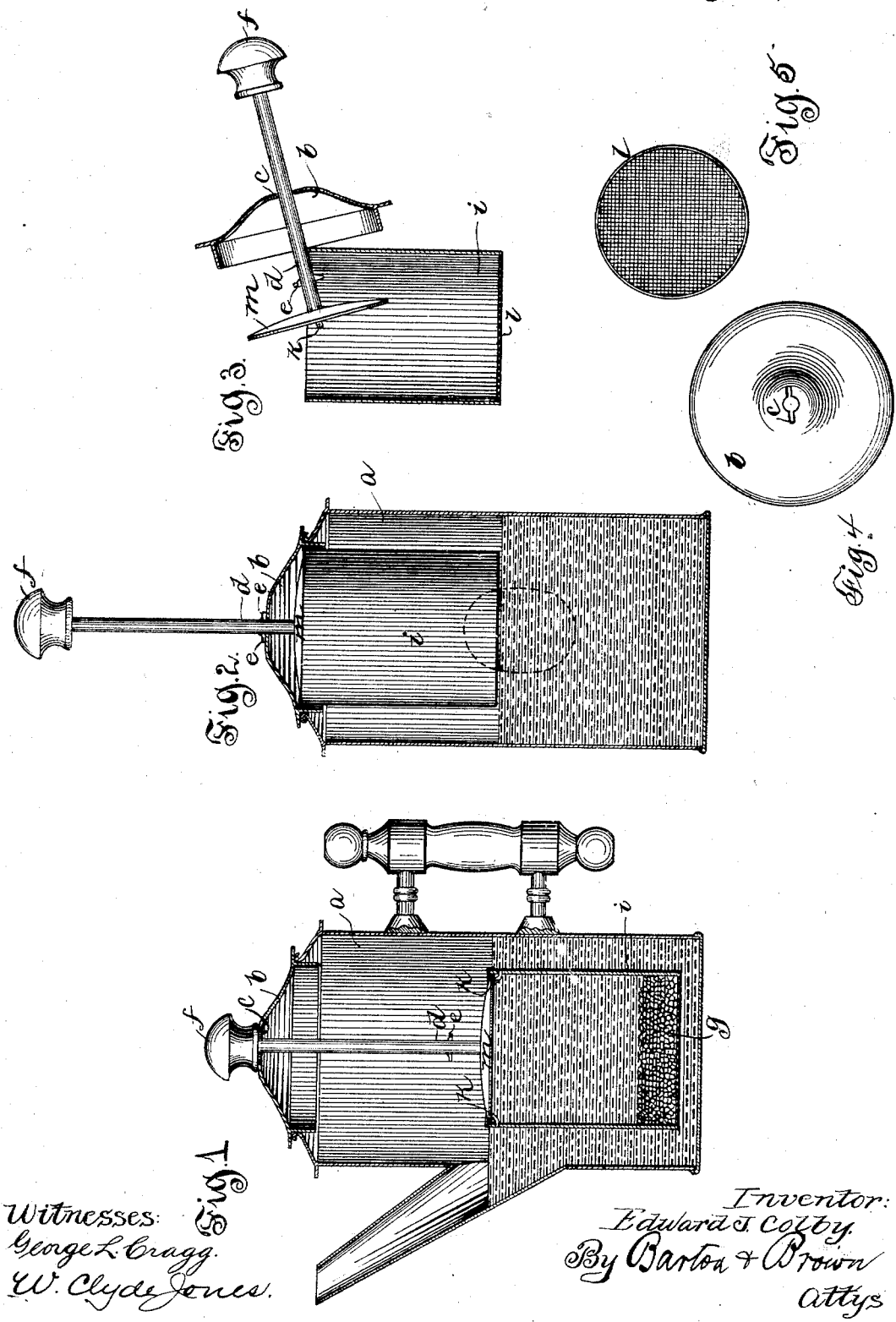

EDWARD J. COLBY, OF CHICAGO, ILLINOIS, ASSIGNOR TO E. Y. LOOMIS, OF SAME PLACE.

COFFEE-POT.

SPECIFICATION forming part of Letters Patent No. 503,563, dated August 15, 1893.

Application filed June 25, 1892. Serial No. 437,980. (No model.)

*To all whom it may concern:*

Be it known that I, EDWARD J. COLBY, a citizen of the United States, residing at Chicago, in the county of Cook and State of Illinois, have invented a certain new and useful Improvement in Coffee-Pots, (Case No. 3,) of which the following is a full, clear, concise, and exact description, reference being had to the accompanying drawings, forming a part of this specification.

My invention relates to coffee pots, and its object is to provide a coffee pot in which the coffee may be conveniently boiled, steeped, steamed and strained.

My invention consists in a receptacle adapted to be held within the coffee pot, said receptacle being provided with a perforated bottom and with a cover which is adapted to be turned to provide means for placing the coffee within the receptacle, and means for holding the said receptacle above the water within the pot.

In the accompanying drawings Figure 1 represents a sectional elevation of the coffee pot of my invention. Fig. 2 represents a sectional elevation at right angles to that of Fig. 1 with the receptacle withdrawn from the liquid. Fig. 3 represents the receptacle removed from the coffee pot and the cover thereto turned as when it is desired to fill it with coffee or remove the grounds. Fig. 4 is a top view of the cover only of the coffee pot. Fig. 5 shows a form of strainer of which the bottom of the receptacle is made.

Like parts are indicated by similar letters of reference throughout the different figures.

The coffee pot $a$ is of ordinary form and any desirable dimensions, and is provided with the cover $b$ in the center of which is the slot $c$ through which the bar $d$ is adapted to pass. Upon the bar $d$ I arrange one or more catches $e\ e$ which are adapted to pass through the slot $c$, but when the bar $d$ is turned, as shown in Fig. 2, the catches $e\ e$ rest upon the cover and support the receptacle which is suspended from the bar $d$. The knob $f$, which is preferably of wood or some poor conductor of heat, rests upon the top of the cover when the receptacle is in the position shown in Fig. 1 and suspends the receptacle above the bottom of the pot, allowing thus a circulation of the liquid through the bottom of the receptacle and the coffee $g$ contained therein. The top $m$ of the receptacle $i$ is preferably disk shaped, so as to entirely cover the receptacle. It can be made, however, of two arms alone which would permit the securing of some of the advantages of my invention. The receptacle $i$ is suspended from the cover by the hooks $k\ k$ which permit the cover to be turned, as shown in Fig. 3. I preferably make the receptacle the same size as the inside of the cover $b$ so that when it is entirely withdrawn from the liquid, as shown in Fig. 2, it will fit the cover as shown.

The strainer placed in the bottom $l$ of the receptacle may be of the form shown in Fig. 5, or it may be in the form of a disk of tin with perforations. What I aim to accomplish with this strainer is to permit the circulation of the liquid through the coffee within the receptacle and to strain the coffee by lifting the receptacle from the solution. I also secure, when desired, the steaming of the coffee by suspending the receptacle above the water, and causing the water to boil.

From the foregoing description the operation of my invention will be readily understood. When it is desired to steep or boil the coffee, the desired amount of water is first poured into the pot and the receptacle partially or completely filled with coffee, is placed therein, as shown in Fig. 1, when the coffee may be steeped or boiled as desired.

A very desirable method of making coffee is to first boil the water and then immerse the coffee therein. This method is rendered feasible and convenient by my invention. The water within the coffee pot being first brought to the boiling point and then removed from the fire, when the receptacle with the coffee is immediately immersed in the water and allowed to stand a suitable length of time. When it is desired to steam the coffee the receptacle with the coffee is placed as shown in Fig. 2, and the water is caused to boil. After the boiling, steaming or steeping of the coffee the receptacle is raised from the solution and thus left to drain, after which it is removed from the pot and the grounds poured out.

Having thus described my invention, what

I claim as new, and desire to secure by Letters Patent, is—

1. The combination with the coffee pot, of a receptacle adapted to be suspended therein, a rod adapted to pass through an opening in the cover of said pot, and a plate attached to the lower end of said rod and perpendicular thereto to which said receptacle is hinged; whereby said receptacle may be turned to permit the filling or emptying of said receptacle, substantially as described.

2. In a coffee pot, the combination with the receptacle $i$, of the bottom $l$, the bar $d$ provided with the catch $e$ and the knob $f$, the cover $m$ provided with the hooks $k\ k$, from which the receptacle is suspended, the cover $b$ having the slot $c$, substantially as and for the purpose specified.

In witness whereof I hereunto subscribe my name this 21st day of May, A. D. 1892.

EDWARD J. COLBY.

Witnesses:
M. JEANE TALLETT,
CHAS. A. BROWN.